United States Patent
Ranjan et al.

(10) Patent No.: US 12,346,625 B2
(45) Date of Patent: Jul. 1, 2025

(54) CONTROLLED SCREEN SHARING

(71) Applicant: International Business Machines Corporation, Armonk, NY (US)

(72) Inventors: Paritosh Ranjan, Kolkata (IN); Prodip Roy, Kolkata (IN); Bhubaneswar Padhan, Kolkata (IN); Prosanta Saha, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 18/360,867

(22) Filed: Jul. 28, 2023

(65) Prior Publication Data

US 2025/0036346 A1    Jan. 30, 2025

(51) Int. Cl.
*G06F 3/14*       (2006.01)
*G06F 3/04842*    (2022.01)
*H04L 65/403*     (2022.01)

(52) U.S. Cl.
CPC ........ *G06F 3/1454* (2013.01); *G06F 3/04842* (2013.01); *H04L 65/403* (2013.01)

(58) Field of Classification Search
CPC .................................................... G06F 3/1454
USPC ....................................................... 715/753
See application file for complete search history.

(56) References Cited

U.S. PATENT DOCUMENTS

| | | | | |
|---|---|---|---|---|
| 7,266,779 B2 * | 9/2007 | Baek | ...................... | H04L 67/148 715/744 |
| 7,991,916 B2 * | 8/2011 | Meek | ...................... | G06F 9/541 709/227 |
| 8,185,828 B2 * | 5/2012 | Liu | ...................... | G06Q 10/10 715/753 |
| 10,430,144 B2 * | 10/2019 | Zheng | ................... | G06F 40/103 |
| 11,134,217 B1 * | 9/2021 | Goel | ..................... | G06V 40/174 |
| 11,228,627 B1 * | 1/2022 | Rangarajan | ......... | H04L 65/4025 |
| 12,003,889 B1 * | 6/2024 | Rajasekar | ............ | G06F 3/04815 |
| 2004/0075619 A1 * | 4/2004 | Hansen | .................... | G06F 9/451 345/1.1 |
| 2004/0080504 A1 * | 4/2004 | Salesky | ............... | H04L 12/1827 345/418 |
| 2006/0031779 A1 * | 2/2006 | Theurer | ................ | G06F 3/1454 715/781 |
| 2006/0190968 A1 * | 8/2006 | Jung | ....................... | G11B 27/11 725/74 |
| 2011/0271211 A1 * | 11/2011 | Jones | .................... | H04M 3/567 715/753 |

(Continued)

OTHER PUBLICATIONS

Jeuk et al., "Context-Aware Screen Sharing for Online Meetings", Technical Disclosure Commons, Feb. 4, 2022, 13 Pages.

(Continued)

*Primary Examiner* — Reza Nabi
(74) *Attorney, Agent, or Firm* — Michael O'Keefe

(57) ABSTRACT

According to one embodiment, a method, computer system, and computer program product for controlled screen sharing is provided. The embodiment may include detecting a user intention to begin a screen sharing session during a web conference. The embodiment may also include receiving a user selection of a first view to display during the screen sharing session. The embodiment may further include receiving a user selection of a first subset of web conference participants. The embodiment may also include displaying the first view to the first subset.

15 Claims, 4 Drawing Sheets

(56) References Cited

U.S. PATENT DOCUMENTS

| | | | | |
|---|---|---|---|---|
| 2012/0011451 | A1* | 1/2012 | Bansal | H04L 12/1827 715/753 |
| 2013/0007895 | A1* | 1/2013 | Brolley | G06F 21/62 726/28 |
| 2013/0263021 | A1* | 10/2013 | Dunn | H04N 21/8173 715/756 |
| 2013/0290863 | A1* | 10/2013 | Chen | H04L 65/4015 715/747 |
| 2016/0283586 | A1* | 9/2016 | Thapliyal | G06Q 10/10 |
| 2016/0323333 | A1* | 11/2016 | Aggarwal | H04N 7/152 |
| 2017/0300286 | A1* | 10/2017 | Lieb | G06F 3/1454 |
| 2018/0217801 | A1* | 8/2018 | Soni | G06F 3/1454 |
| 2019/0166330 | A1* | 5/2019 | Ma | H04L 65/403 |
| 2021/0099488 | A1* | 4/2021 | Schrager | H04L 63/20 |
| 2022/0236838 | A1* | 7/2022 | Park | G06F 3/0482 |
| 2023/0051262 | A1* | 2/2023 | Yanez | G06F 9/452 |
| 2023/0054044 | A1* | 2/2023 | Abraham | G06F 9/547 |
| 2023/0059019 | A1* | 2/2023 | Asthana | H04L 65/4015 |
| 2023/0091539 | A1* | 3/2023 | Lan | H04L 12/1822 348/14.09 |
| 2023/0126163 | A1* | 4/2023 | Wu | G06F 3/167 704/275 |
| 2023/0315262 | A1* | 10/2023 | Surana | G06F 3/0484 715/204 |
| 2023/0370434 | A1* | 11/2023 | Nadir | H04L 63/20 |
| 2024/0069851 | A1* | 2/2024 | Link | H04L 65/1096 |
| 2024/0073366 | A1* | 2/2024 | Dsouza | H04L 12/1895 |
| 2024/0146873 | A1* | 5/2024 | Goodine | H04L 12/1827 |
| 2024/0163399 | A1* | 5/2024 | Jaiswal | H04L 12/1831 |
| 2024/0220327 | A1* | 7/2024 | Talavera | G06Q 50/01 |
| 2024/0256345 | A1* | 8/2024 | Talavera | G06F 9/5027 |
| 2024/0377918 | A1* | 11/2024 | Okuzawa | G06F 3/04815 |
| 2025/0036346 | A1* | 1/2025 | Ranjan | G06F 3/1454 |

OTHER PUBLICATIONS

Webex, "Easy screen sharing in 2021 with Webex", Webex by Cisco, Accessed May 10, 2023, 6 Pages.

Zoom, "Sharing your screen or desktop on Zoom", Zoom Support, May 2, 2023, 4 Pages.

Skiwot, M., Best Screen Sharing Practices For Small Businesses, Retrieved from:https://blog.webex.com/collaboration/video-conferencing/best-screen-sharing-practices-for-small-businesses/, Oct. 25, 2022, 8 pages.

* cited by examiner

CONTROLLED SCREEN SHARING

BACKGROUND

The present invention relates generally to the field of computing, and more particularly to web conferencing.

Web conferencing, including but not limited to audio conferencing and video conferencing, may relate to any communication between two or more individuals over a network, such as the Internet, where the participating members utilize audio and/or video streams. Web conferencing allows for a dynamic interface between users in separate locations to efficiently communicate as if they were in person by allowing face-to-face interactions and the sharing of files between participating users. Popular web conferencing applications include Zoom® (Zoom and all Zoom-based trademarks and logos are trademarks or registered trademarks of Zoom Video Communications Inc. and/or its affiliates), Webex® (Webex and all Webex-based trademarks and logos are trademarks or registered trademarks of Webex Communications, Inc. and/or its affiliates), GoToMeeting® (GoToMeeting and all GoToMeeting-based trademarks and logos are trademarks or registered trademarks of Citrix Online, LLC. and/or its affiliates), and FaceTime® (Facetime and all Facetime-based trademarks and logos are trademarks or registered trademarks of Apple Inc. and/or its affiliates) among others.

Additionally, many web conferencing applications allow for the dynamic sharing of one participant's graphical user interface, as projected on a user device display screen, to the other participants of the web conference. Many applications allow for such screen sharing sessions to be isolated to a specific display screen, in a multi-monitor or multi-display screen environment, or a specific software application currently executing on the user device.

SUMMARY

According to one embodiment, a method, computer system, and computer program product for controlled screen sharing is provided. The embodiment may include detecting a user intention to begin a screen sharing session during a web conference. The embodiment may also include receiving a user selection of a first view to display during the screen sharing session. The embodiment may further include receiving a user selection of a first subset of web conference participants. The embodiment may also include displaying the first view to the first subset.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
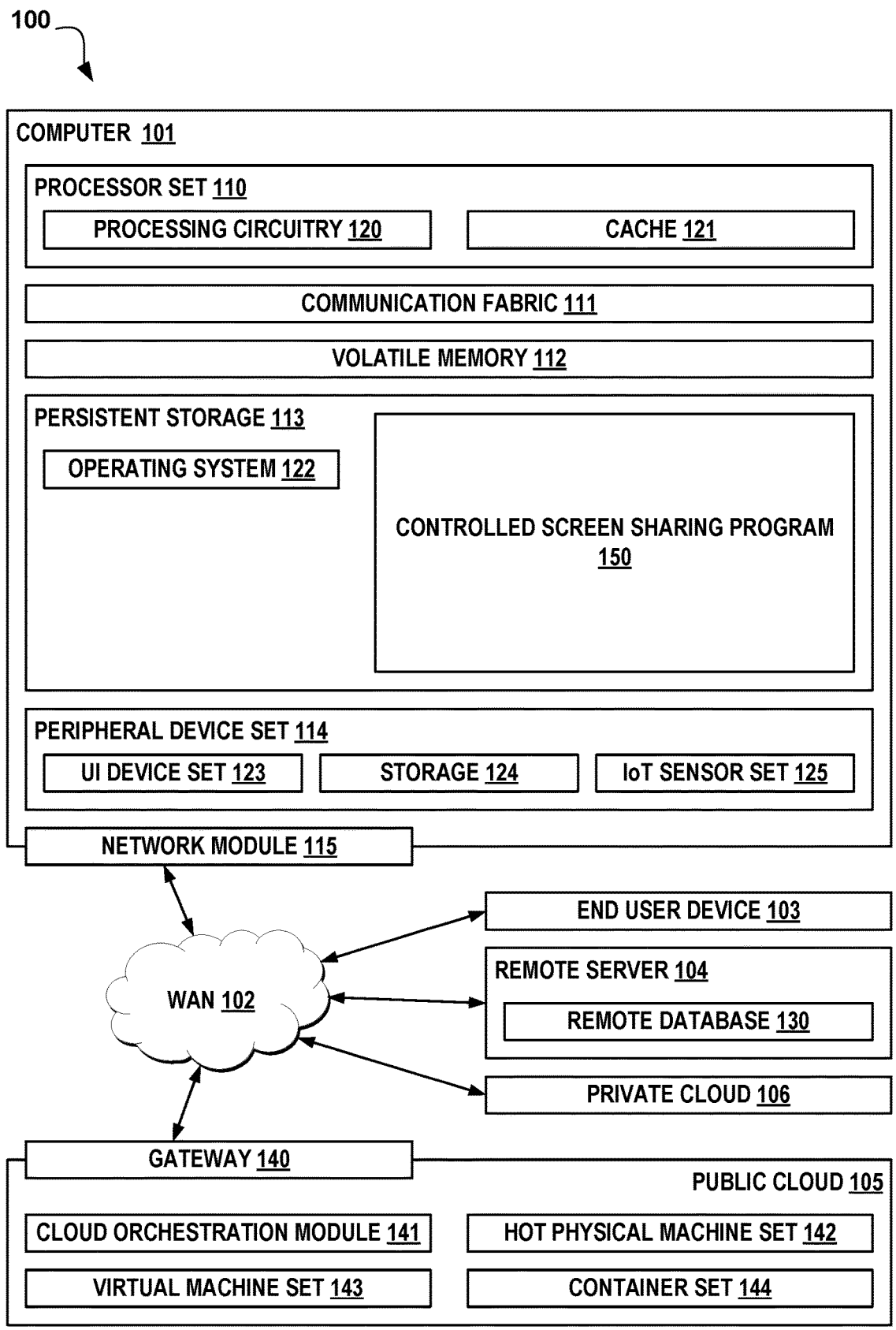
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to web conferencing. The following described exemplary embodiments provide a system, method, and program product to, among other things, allow for selective screen sharing of specific content with a specific set of web conference participants. Therefore, the present embodiment has the capacity to improve the technical field web conferencing by enabling functionality to choose which shared content during a screen sharing session of a web conference can be seen by specific groups of participants.

As previously described, web conferencing, including but not limited to audio conferencing and video conferencing, may relate to any communication between two or more individuals over a network, such as the Internet, where the participating members utilize audio and/or video streams. Web conferencing allows for a dynamic interface between users in separate locations to efficiently communicate as if they were in person by allowing face-to-face interactions and the sharing of files between participating users. Popular web conferencing applications include Zoom®, Webex®, GoToMeeting®, and FaceTime® among others.

Additionally, many web conferencing applications allow for the dynamic sharing of one participant's graphical user interface, as projected on a user device display screen, to the other participants of the web conference. Many applications allow for such screen sharing sessions to be isolated to a specific display screen, in a multi-monitor or multi-display screen environment, or a specific software application currently executing on the user device.

In modern society, many individuals are exposed to some form of online work in their professional career and/or personal life. Due to the interconnectedness of modern civilization that allows for the closing of distance gaps between individuals, many interactions between individuals are now available in an online setting through web conferencing platforms that allow presented to share their screen with other participants in order to share information. However, many individuals may wish or are required to maintain privacy over certain data points. Therefore, some web conference presenters sharing their screen may not wish for their entire screen to be displayed to every participant in a web conference or may only wish for a specific application to be viewable to some participants but not to others whether for confidentiality reasons, separation of duty, or operational purposes. As such, it may be advantageous to, among other things, implement a screen sharing setting that allows a presenter to designate specific portions of media that can be shared with specific users participating in a web conference.

According to at least one embodiment, a controlled screen sharing program may share different parts of a display screen, or different applications running on a computing device, in a screen sharing session of a web conference with different user groups in a manner that the users of a group can only see the part of the screen, or application, shared to their respective group. Upon initiating a screen sharing session, the controlled screen sharing program may prompt a user to designate a portion of a graphical user interface or display screen projection or application view with which to share as well as a group of participants in the web conference with whom to share the portion or the application view. The controlled screen sharing program may allow multiple views or applications to be shared concurrently and to different groups of participants based on a number of sharing user configurations.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as controlled screen sharing program 150. In addition to controlled screen sharing program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and controlled screen sharing program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in controlled screen sharing program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in controlled screen sharing program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile.

In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to at least one embodiment, the controlled screen sharing program 150 may allow a user initiating a screen sharing session to designate an application or a portion of the display screen projection currently viewable during the web conference as well as one or more groups of participants, which may include subsets or all participants in the web conference. If the screen sharing user has selected more than one group or subset or users and more than one portion or application with which to share, the controlled screen sharing program 150 may then allow the sharing user to indicate which group or subset should have access to which portion or application. Upon receiving the sharing participant selections, the controlled screen sharing program 150 may display the corresponding screen portion or application to the respective web conference participants.

Additionally, prior to initially performing any actions, the controlled screen sharing program 150 may perform an opt-in procedure. The opt-in procedure may include a notification of the data the controlled screen sharing program 150 may capture and the purpose for which that data may be utilized by the controlled screen sharing program 150 during data gathering and operation. Furthermore, notwithstanding depiction in computer 101, the controlled screen sharing program 150 may be stored in and/or executed by, individually or in any combination, end user device 103, remote server 104, public cloud 105, and private cloud 106. The context-aware voice self-authorization method is explained in more detail below with respect to FIGS. 2-5.

Figure 2:
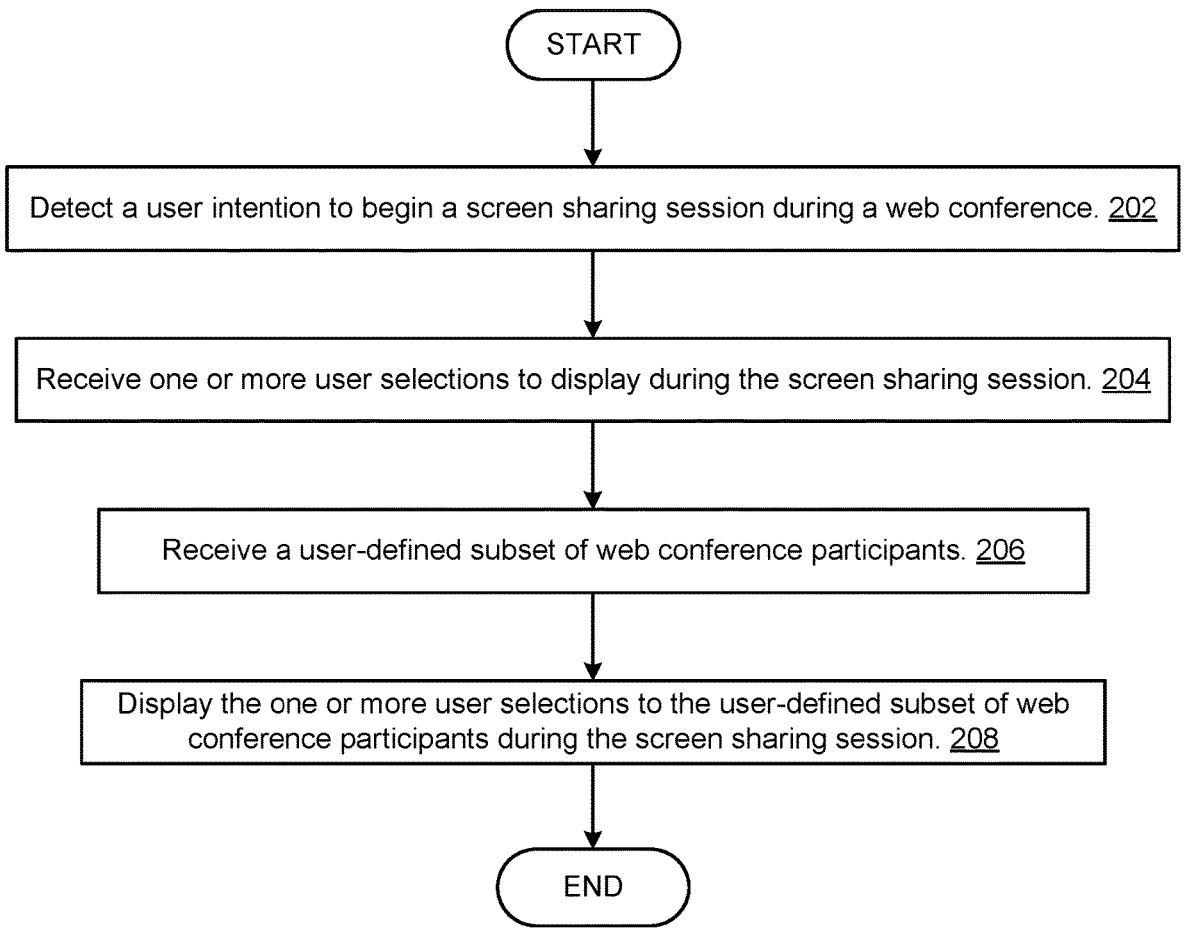
FIG. 2 illustrates an operational flowchart for a selective screen sharing process according to at least one embodiment.

Referring now to FIG. 2, an operational flowchart for a selective screen sharing process 200 according to at least one embodiment. At 202, the controlled screen sharing program 150 detects a user intention to begin a screen sharing session during a web conference. The controlled screen sharing program 150 may detect that a user wishes to begin a screen sharing session during a web conference when the user interacts with an icon on a graphical user interface of a web conferencing application that initiates a screen sharing session. The user may be any participant to the web conference, including the host participant.

Then, at 204, the controlled screen sharing program 150 receives one or more user selections to display during the screen sharing session. Upon a user initiating a screen sharing session, the controlled screen sharing program 150 may, before actually starting the screen sharing session, prompt the user with a dialog box asking the user to select one or more configurable options related to the screen sharing session, such as whether the user wishes to initiate a partial screen share, an application view screen share, and users to whom the screen share may be viewed.

A partial screen share may relate to a user designating a portion of one or more images projected on a display screen for use as the subject of a screen sharing session with other web conference participants. The controlled screen sharing program 150 may allow a user to select the perimeter of the portion in any number of manners, such as, but not limited to, selecting any number of corners of a geometric shape including zero corners to indicate a circular portion to share or a selecting a specific shape from a preconfigured list, selecting a placement of the shape on the sharing user's graphical user interface, and dragging the cursor across the display screen to indicate the size of the portion desired by the user. For example, a user initiating a screen share may select four corners of a portion of the display screen to share a square or rectangle or six corners to share a hexagon portion of the display screen. The size and shape of the portion in such an example may only be limited to the number and location of the user-designated perimeter points of the portion. Similarly, the controlled screen sharing program 150 may present the user wishing to initiate the screen share with preconfigured shape options from which to select a desired shape of the portion.

An application view screen share may relate to sharing a current view of an open application on the sharing user's computing device. Upon initiating a screen sharing session and that an application view is desired, the controlled screen sharing program 150 may prompt the user to select an open application to use as the basis for the screen sharing session. Once selected and shared with the designated web conference participants, the controlled screen sharing program 150 may only present the selected application view to the desired web conference participants regardless of the application the sharing user is actively viewing and engaging with. In one or more embodiments, the controlled screen sharing program 150 may allow a sharing user to select an application that is not currently executing on the sharing user's computing device. If the sharing user chooses to share an application view of a currently closed application, the controlled screen sharing program 150 may open the application and begin sharing the application view.

Next, at 206, the controlled screen sharing program 150 receives a user-defined subset of web conference participants. As previously described, upon a user initiating a screen sharing session, the controlled screen sharing program 150 may, before starting the screen sharing session, prompt the user with a dialog box asking the user to select one or more configurable options related to the screen sharing session. One such configurable option may include the controlled screen sharing program 150 prompting the screen sharing user to select a group of web conference participants, including either a subset or the entirety of the web conference participants, with whom to participate in the screen share. For example, in a web conference between six participants, a screen sharing participant may choose to allow only three of the other participants to participate in the screen share for any variety of reasons including, but not limited to, confidentiality or sensitivity of the information being shared.

In one or more embodiments, the controlled screen sharing program 150 may allow the screen sharing participant to select more than one partial screen views, one or more application views, and/or one or more groups of web conference participants to engage in screen sharing. Such configurations may effectively allow a participant to share different views with different groups of web conference participants during the same screen sharing session. For example, the screen sharing participant may select a left portion of a display screen to share with one subset of web conference participants and a right portion of the display screen to share with a second subset of web conference participants.

In one or more other embodiments, the controlled screen sharing program 150 may allow the screen sharing participant to include specific web conference participants in different groups for screen sharing. For example, if a user wishes to share two partial screen views during a screen sharing session and selects two groups of web conference participants capable of viewing each view, the controlled screen sharing program 150 may allow the user to include the same web conference participant in each group thus allowing that web conference participant the ability to view both partial screen views during the session when other participants that are included in only a single group can view only the partial screen view corresponding to that group. In such a situation, the controlled screen sharing program 150 may effectively create a third group of web conference participants (e.g., participants allowed to view one partial screen view, participants allowed to view the other partial screen view, and participants allowed to view both partial screen views).

Then, at 208, the controlled screen sharing program 150 displays the one or more user selections to the user-defined subset of web conference participants during the screen sharing session. Once the controlled screen sharing program 150 receives the one or more user selections of media to display and the user-defined subset of web conference participants, the controlled screen sharing program 150 may initiate the screen sharing session and display the images of the screen share according to these selections.

When a user selection is made to share a portion of images on the device display screen, the controlled screen sharing program 150 may use the client-side user interface components to draw and configure the windows and associate each window with a group of users for sharing. The controlled screen sharing program 150 may store the window configures (i.e., the window coordinates of the shape of the selected portion) and their association with users in a repository, such as storage 124 or remote database 130, associated with or accessible to the server-side iteration of the controlled screen sharing program 150. When any frame to share passes through the server-side iteration of controlled screen sharing program 150, only the specific part of the screen, decided by the coordinates of the window associated with the specific web conference participant, is transferred to the client-side iteration of the controlled screen sharing program 150 and the web conferencing software by resizing the frame to only the specified window's coordinates.

When a user selection is made to share a specific application view, the client-side user interface components may be used to associate each application with a group of users for sharing. These application-user(s) mapping information (i.e., application pid, name, and users the application is shared with) is stored by controlled screen sharing program 150 in a repository, such as database 124 or remote database 130. When a frame in the screen share is transmitted, the controlled screen sharing program 150 may transfer the frame only to the web conference participants with whom the sharing participant has approved sharing of that specific application based on a comparison of the mapping information associated with the transferred frame and the mapping information within the repository indicating approved sharing participants. If any application view is shared on screen which is not allowed to be seen by a specific user based on the stored mapping information, then the controlled screen sharing program 150 may not display the shared screen to that user.

Figure 3:
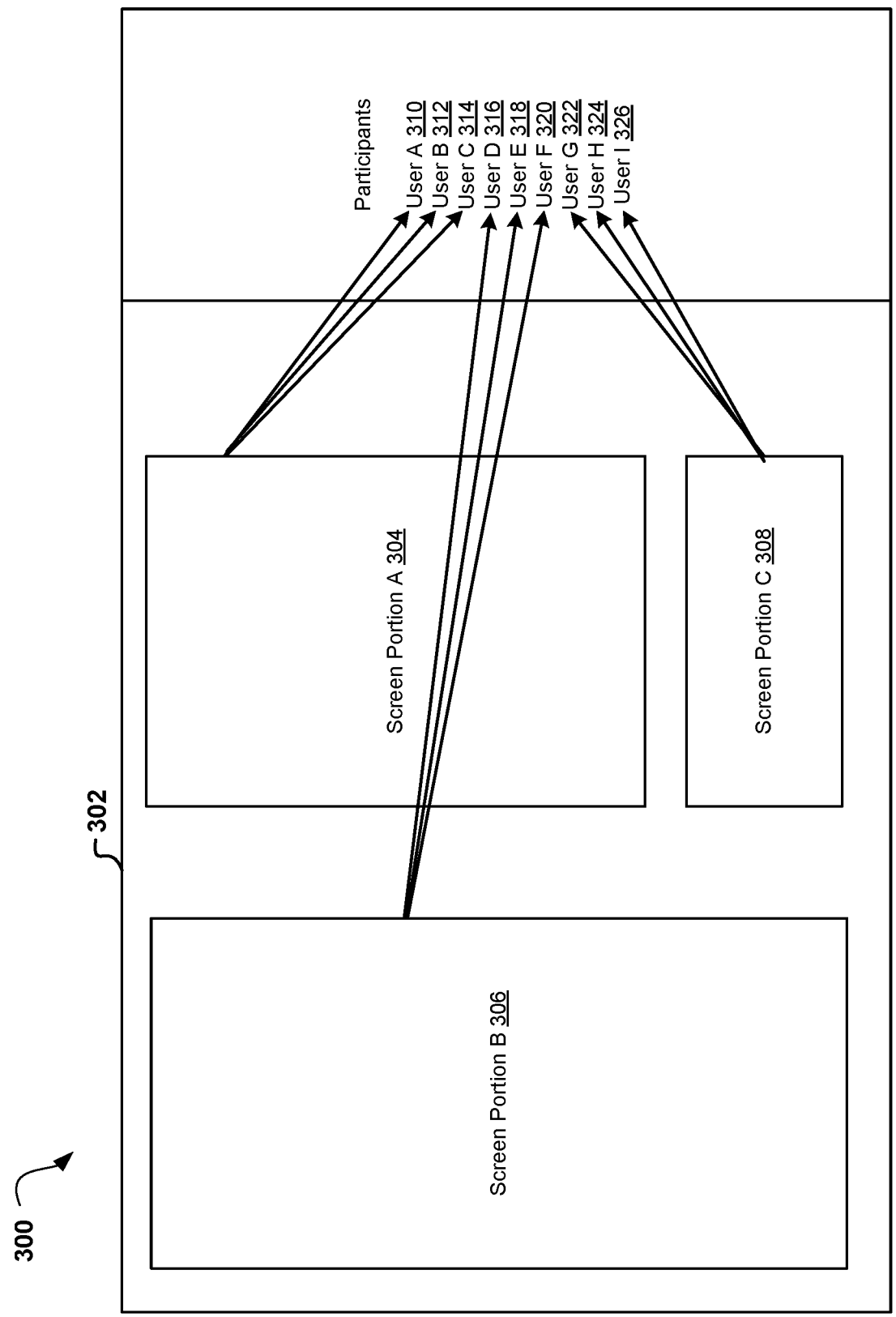
FIG. 3 illustrates a functional block diagram of a screen sharing session of a subset of a graphical user interface with a subset of web conference participants according to at least one embodiment.

Referring now to FIG. 3, a functional block diagram of a screen sharing session 300 of a subset of a graphical user interface 300 with a subset of web conference participants according to at least one embodiment. While participating in a web conference using an application, such as a web conferencing application, that presents a graphical user interface 302, the controlled screen sharing program 150 may receive instructions from a user to begin a screen sharing session based on user-defined portions of the graphical user interface 302. The controlled screen sharing program 150 may then prompt the user to indicate portions of the graphical user interface 302 that the user wishes to share during the screen sharing session. Responsive to the prompt, the user may define screen portion A 304, screen portion B 306, and screen portion C 308 by either selecting each corner of the desired screen portions or by selecting a predefined shape from a pop-up settings menu or widget presented on the graphical user interface 302 then resized according to the sharing user's preferences. Once the screen portions 304-308 are defined, the controlled screen sharing program 150 may prompt the user to indicate which users should be permitted to view which screen portion. The controlled screen sharing program 150 may present a list on the graphical user interface 302 as a pop-up or widget, similar to the selection of the screen portions described above, that includes each participant to the web conference with a radio box, or other user selection icon, corresponding to each screen portion. For example, the controlled screen sharing program 150 may present a list of users A-I 310-326 with a selection icon for each of screen portion A 304, screen portion B 306, and screen portion C 308. Upon receiving the user selections, the controlled screen sharing program 150 may separate the users A-I 310-326 into groups based on the sharing user's selections. For example, users A-C 310-314 may be grouped together, users D-F 316-320 may be grouped together and users G-I 322-326 may be grouped together. Based on the groupings and the user selections, the controlled screen sharing program 150 may display screen portion A 304 to users A-C 310-314, screen portion B 306 to users D-F 316-320, and screen portion C 308 to users G-I 322-326.

Figure 4:
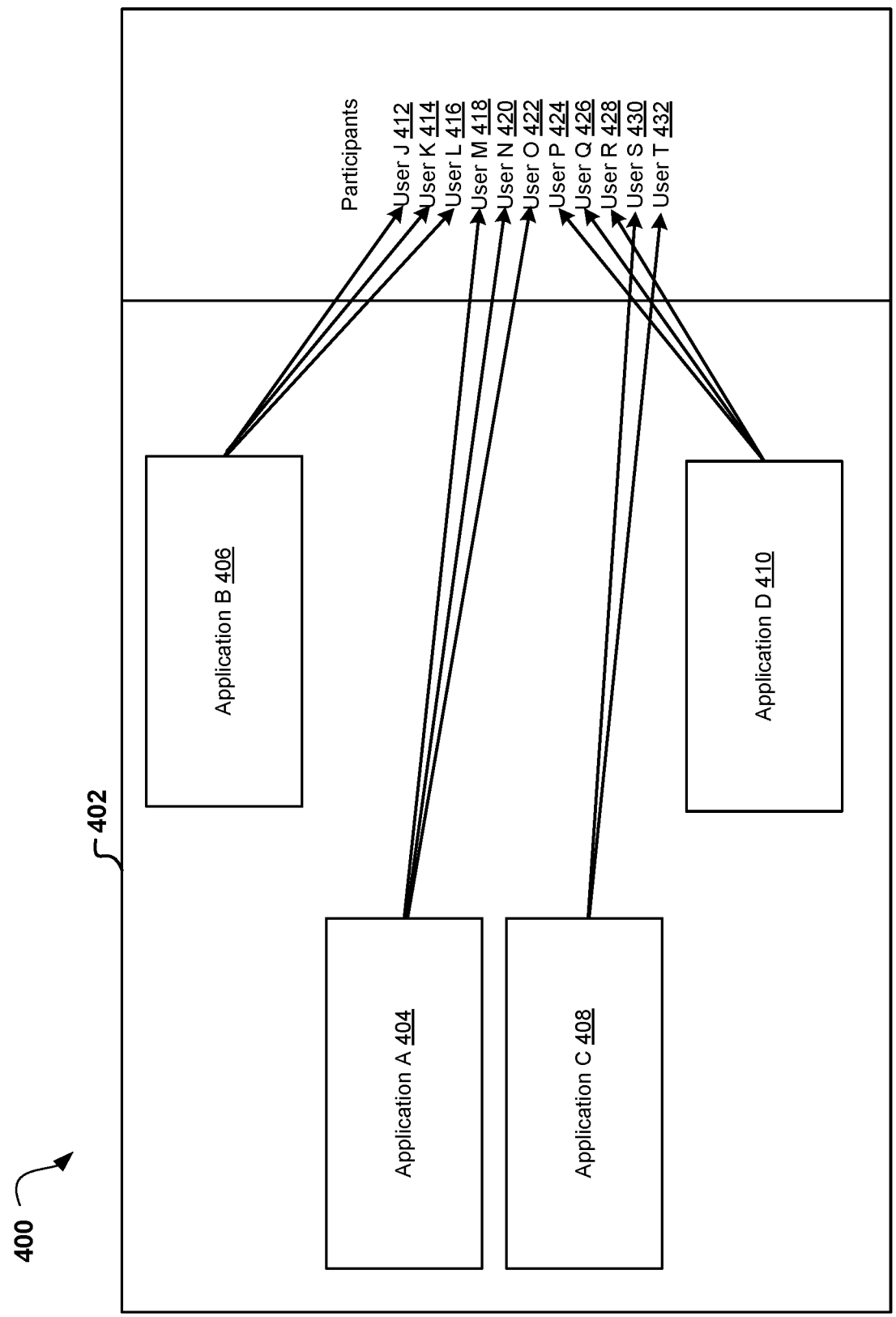
FIG. 4 illustrates a functional block diagram of a screen sharing session of an application with a subset of web conference participants according to at least one embodiment.

Referring now to FIG. 4, a functional block diagram of a screen sharing session 400 of an application with a subset of web conference participants according to at least one embodiment. While participating in a web conference using an application, such as a web conferencing application, that presents a graphical user interface 402, the controlled screen sharing program 150 may receive instructions from a user to begin a screen sharing session based on user-defined application views of open applications. The controlled screen sharing program 150 may then prompt the user to indicate which applications the user wishes to share during the screen sharing session. The controlled screen sharing program 150 may present the user with a list of applications available for screen sharing to the web conference participants as either a list, pop-up, or widget displayed on the graphical user interface 402. Responsive to the prompt, the user may indicate views of application A 404, application B 406, application C 408, and application D 410. Once the applications 404-410 are defined, the controlled screen sharing program 150 may prompt the user to indicate which users should be permitted to view which application. The controlled screen sharing program 150 may present a list on the graphical user interface 402 as a pop-up or widget, similar to the selection of the applications described above, that includes each participant to the web conference with a radio box, or other user selection icon, corresponding to each screen portion. For example, the controlled screen sharing program 150 may present a list of users J-T 412-432 with a selection icon for each of application A 404, application B 406, application C 408, and application D 410. Upon receiving the user selections, the controlled screen sharing program 150 may separate the users J-T 412-432 into groups based on the sharing user's selections. For example, users J-L 412-416 may be grouped together, users M-O 418-422 may be grouped together, users P-R 424-428 may be grouped together and user S 430 and user T 432 may be grouped together. Based on the groupings and the user selections, the controlled screen sharing program 150 may display application A 404 to users M-O 418-422, application B 406 to users J-L 412-416, application C 408 to user S 430 and user T 432, and application D 410 to users P-R 424-428.

It may be appreciated that FIGS. 2-4 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
   detecting a user intention to begin a screen sharing session during a web conference;
   receiving a user selection of a first view to display during the screen sharing session, wherein the first view is a user-designated portion of one or more images currently projected on a graphical user interface of a computing device display screen, and wherein receiving the user selection of the first view further comprises:
   receiving one or more perimeter points of the user-designated portion, wherein a shape and a size of the user-designated portion are defined by a number and a location of the one or more perimeter points;
   receiving a user selection of a first subset of web conference participants; and
   displaying the first view to the first subset.

2. The method of claim 1, further comprising: receiving a user selection of a second view to display during the screen sharing session; receiving a user selection of a second subset of web conference participants; and displaying, concurrently to displaying the first view to the first subset, the second view to the second subset.

3. The method of claim 1, wherein the second subset includes one or more web conference participants in the first subset.

4. The method of claim 1, wherein the first view is an application view of an open application currently executing on a client device.

5. The method of claim 1, wherein the first view is an application view of a closed application on a client device, and further comprising: in response to the user selection of the first view, opening the closed application.

6. A computer system, the computer system comprising: one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
   detecting a user intention to begin a screen sharing session during a web conference;
   receiving a user selection of a first view to display during the screen sharing session, wherein the first view is a user-designated portion of one or more images currently projected on a graphical user interface of a computing device display screen, and wherein receiving the user selection of the first view further comprises:

receiving one or more perimeter points of the user-designated portion, wherein a shape and a size of the user-designated portion are defined by a number and a location of the one or more perimeter points;

receiving a user selection of a first subset of web conference participants; and displaying the first view to the first subset.

7. The computer system of claim 6, wherein the method further comprises:

receiving a user selection of a second view to display during the screen sharing session; receiving a user selection of a second subset of web conference participants;

and displaying, concurrently to displaying the first view to the first subset, the second view to the second subset.

8. The computer system of claim 6, wherein the second subset includes one or more web conference participants in the first subset.

9. The computer system of claim 6, wherein the first view is an application view of an open application currently executing on a client device.

10. The computer system of claim 6, wherein the first view is an application view of a closed application on a client device, and further comprising: in response to the user selection of the first view, opening the closed application.

11. A computer program product, the computer program product comprising: one or more computer-readable tangible storage medium and program instructions stored on at least one of the one or more tangible storage media, the program instructions executable by a processor capable of performing a method, the method comprising:

detecting a user intention to begin a screen sharing session during a web conference;

receiving a user selection of a first view to display during the screen sharing session, wherein the first view is a user-designated portion of one or more images currently projected on a graphical user interface of a computing device display screen, and wherein receiving the user selection of the first view further comprises:

receiving one or more perimeter points of the user-designated portion, wherein a shape and a size of the user-designated portion are defined by a number and a location of the one or more perimeter points;

receiving a user selection of a first subset of web conference participants; and displaying the first view to the first subset.

12. The computer program product of claim 11, wherein the method further comprises: receiving a user selection of a second view to display during the screen sharing session; receiving a user selection of a second subset of web conference participants; and displaying, concurrently to displaying the first view to the first subset, the second view to the second subset.

13. The computer program product of claim 11, wherein the second subset includes one or more web conference participants in the first subset.

14. The computer program product of claim 11, wherein the first view is an application view of an open application currently executing on a client device.

15. The computer program product of claim 11, wherein the first view is an application view of a closed application on a client device, and further comprising: in response to the user selection of the first view, opening the closed application.

\* \* \* \* \*